United States Patent [19]
Taylor

[11] Patent Number: 5,386,913
[45] Date of Patent: Feb. 7, 1995

[54] DOCUMENT TRANSPORT SELECTION DEVICE FOR SCANNERS AND CLASSIFIERS OF DOCUMENTS, ESPECIALLY BAR CODE BEARING DOCUMENTS

[76] Inventor: Roberto M. Taylor, Calle 53 No. 728, La Plata, Province of Buenos Aires, Argentina

[21] Appl. No.: 983,727

[22] Filed: Dec. 1, 1992

[30] Foreign Application Priority Data

Dec. 3, 1991 [AR] Argentina .................... 321.305

[51] Int. Cl.⁶ .................... B07C 5/00; B65H 39/10
[52] U.S. Cl. .................... 209/583; 209/652; 209/657; 209/900; 271/298; 271/303
[58] Field of Search ........... 209/579, 583, 584, 652, 209/656, 657, 900, 559, 576; 271/298, 303

[56] References Cited

U.S. PATENT DOCUMENTS

| | | | |
|---|---|---|---|
| 3,984,094 | 10/1976 | Stocker | 271/303 |
| 4,208,009 | 6/1980 | Markkanen et al. | 209/583 X |
| 4,518,161 | 5/1985 | Nakamura | 271/303 |
| 5,054,621 | 10/1991 | Murphy et al. | 209/583 X |

FOREIGN PATENT DOCUMENTS

| | | | |
|---|---|---|---|
| 0157170 | 7/1987 | Japan | 271/303 |
| 2097330 | 11/1982 | United Kingdom | 209/579 |

*Primary Examiner*—D. Glenn Dayoan
*Assistant Examiner*—Tuan N. Nguyen
*Attorney, Agent, or Firm*—Michael D. Bednarek

[57] ABSTRACT

A document transport device for document scanners and classifiers such as bar code readers which is able to send a read document different directions depending on its classification is discussed. The transport device uses a pivotable surface to direct documents and is able to be used with high speed document reading machines and documents of varying size and width.

12 Claims, 2 Drawing Sheets

DOCUMENT TRANSPORT SELECTION DEVICE FOR SCANNERS AND CLASSIFIERS OF DOCUMENTS, ESPECIALLY BAR CODE BEARING DOCUMENTS

FIELD OF THE INVENTION

This invention relates to a device which selects a document's travel path and can be used with document scanning machines, including a bar code type scanning machine.

More particularly, the present invention covers a device which is able to, at high speeds, read a document, identify it according to predetermined parameters and decide the internal route the paper has to follow, based on one or more reading parameters, and define the place where the document will be finally stored after the reading over and classification functions.

BACKGROUND OF THE INVENTION

Devices which are able to read, classify and determine the final destination of various documents, as for example check readers of mailing pieces scanners, are known in the art.

Examples of the prior art include U.S. Pat. No. 4,626,872 to Sapitowicz which shows a document scanner with interstage stops; and U.S. Pat. No. 4,796,242 to Pierce which shows a document scanner in which reading is performed on a cart. In this case, reading cannot be done at high speed and documents of different size or weight cannot be processed without modification of the machine.

U.S. Pat. No. 4,511,793 shows a machine which contains rollers in its transport mechanism and it includes the concept of change of direction but transport is slow and the rollers are not useful for document reading.

U.S. Pat. No. 4,798,944 to Corner, covers a machine capable of transversal movements which makes documents run in two different and separate ways, but which does not allow for high speed constant reading of equal quality.

U.S. Pat. No. 4,764,976 to Kallin, deals with a unit having as its basic property its ability to align the document to be read; a capacity which is not sought in the case of the present invention.

These known devices, apt for document classification, usually have complex transport mechanisms, are difficult to reach when a document is locked inside and their reading capacity does not reach high speed and versatility when facing a change in width, size or alignment of the document. For the sake of a correct understanding of the words used in the present paper, the key words are hereto defined.

Reading machine: a device capable of passing over a document through a reading station, performing the reading of that document–especially if it is of the bar code type-, assessing the information read and transmitting a determined command according to the reading performance.

Document: for the purpose of the present invention, a document is a laminar piece, preferably a cellulose one, with a printed code to be read by the machine.

Reading medium: the element by means of which the information contained in the document is retrieved when the document passes through the area influenced by that element; in the case of the present invention, the element is an optical scanner reading bar codes.

Bar code: a bar code is a series of parallel marks (or bars) grouped in a certain way so as to define a language which can be retrieved by means of the adequate reading media.

Travel mechanism (inside the machine): the circuit described by the document in the machine from the moment it is fed into it, to the moment it is ejected after reading and storage.

Feeding run-over: the section of the travel mechanism in which reading of a document is performed.

Traction wheels: the wheels which drive the document along the different stages of the travel mechanism.

SUMMARY OF THE INVENTION

It is an object of the present invention to provide a classifying device, at different sites, of a series of documents read by a machine. This device is able to send the documents, after their reading or passing through a reading element or medium, from an original path downstream of the reading medium, to two different selected directions, inside the mentioned classifying machine.

It is also an object to include a classifying device, with more than one reading element. The classifying device, with the already described selective bifurcation, is installed between each pair of reading media.

The document reading machine is one capable of receiving the documents piled up at a hopper. The reading elements or media are specific for bar codes. The device for the selection of bifurcated ways or baffle is a simple one of quick reaction and easy to reach from the outside if a document is locked in the machine. The running time is short and the operation simple.

Hoppers at the end of each baffle serve to feed a new running turn with the corresponding new reading performance, so the information read must follow certain parameters and sensors responses fed to a microprocessor.

The present invention includes a sequential high speed document reading machine able to perform reading by means of a reading element or means arranged to match with part of the document travel inside the machine. It can read a quantity of similar documents stored at the entrance of the mentioned travelling mechanism which is defined, at least partly, by surfaces on which the documents slide.

One aspect of this invention is that the elements defining the travel and the place of operation of the reading media have, at least, two traction wheels. From each wheel, a secant emerges above the document travelling path. The wheels are arranged one after the other and both are aligned in relation to the longitudinal axle of the travelling section.

After the first wheel, there is the first travelling baffle, defined by a slope surface ending in a collection tray (hopper) for the already read documents; against this surface and immediately before the slope of the first baffle, leans the free edge of part of an angular movable surface. The other end is related to a second surface defining the second baffle of the read document leading to a second hopper for the collection of read documents. Above both traction wheels and vertically aligned against each of them, there is an idler wheel with an axle parallel to the axle of each traction wheel. Both idler wheels are mounted on a chassis articulated to the reading machine. The first idler wheel is upstream from the free edge of the angular movable surface. The second traction wheel and its corresponding idler wheel face each other through windows cut at the first by-pass and the angular movable surface. The angular movable surface has a pivot axle which is perpendicular to the document travel at the point of union to the second by-pass surface. The pivot runs from the support against the document travelling way to the point of separation of the free edge. This position marks the entrance to the second by-pass of the read document way and is retained during document passage through this way.

The lower face of the pivoting surface forms the dome of the first travel passage; the dome for the second travel passage is formed by an auxiliary part articulated to the reading machine. The reading element is connected to a medium for processing the information read. This processing medium is connected to the pivot and therefore determines the pivot surface position according to certain parameters of the information read, and also provides indications about document passage.

The new document transport selection device for scanners and classifiers of documents, especially bar code bearing ones, of the present invention refers to the type of machine capable of reading a series of documents at high speed, with the aid of a reading element matched at a section of the document travel way, inside the machine. A number of similar documents are stored in a vertical position at the entrance of the reading runaway. This travel section is defined, at least partly, by surfaces on which documents slide. The media determining the travel section and the area of reading operation have, at least, two traction wheels emerging above the travel way level, as a secant to it. The wheels are laid one after the other and aligned with respect to the longitudinal axle of the travelling path. Immediately after the first traction wheel, the travelling section ends in a by-pass determined by a descendent slope which leads to a first hopper for the collection of already read documents. Against the surface immediately before the descending section of the first by-pass, a free end of an angular movable surface rests, while the opposite end is prolonged into a second surface defining a second by-pass and leading to a second hopper for already read document collection.

Above each traction wheel there is a correspondent idler wheel with an axle parallel to each traction wheel axle. Both idler wheels are mounted on a chassis related to the reading machine. The first idler wheel is upstream from the free end of the angular movable surface. The second traction wheel faces the second idler wheel through windows cut into the first and second by-passes and the angular movable surface, respectively. The movable surface has a pivoting shaft perpendicular to the document travel way, at the point joining the second by-bass. Its pivot element goes from the document travel supporting position to the point of separation of this pivoting surface from its free end. At this point, the entrance to the second by-pass is drawn. The pivoting element keeps the surface pivoted during the passage of the document through the entrance thus formed. The lower face of the pivoting surface becomes the dome for the first by-pass section passage while the dome for the second by-pass section is formed by an auxiliary part articulated to the reading machine. The reading element is a data processing medium connected to the pivot of the pivoting surface and determines its position according to certain parameters related to the information read and processed. This processor is also associated to elements indicating the document passage through its travel section and by-passes.

The means defining the document travel inside the machine and the means defining the document travel along the two bypasses are flat surfaces of horizontal shaft, while the traction and idler wheels are cylindric and located at the mean of the mentioned travelling circuit.

The portion of angular movable surface is a "U" shaped part which opens downstream of the travel path. Its free end leans on a shoulder while the arms forming the U-shape are joined to the surface of the second by-pass by a spring mechanism. The open part of the U is the passage for the second traction wheel.

The arms of the U-shape are embedded into the second by-pass surface. The pivoting elements are constituted by an electromagnet laid above the front edge of this pivoting surface.

The arms of the U-shape are joined to an axle related to the second by-pass and this axle forms the pivoting media for the mentioned pivoting surface.

Based on the combination described, many objects can be developed with the purpose of counting on the already stated advantages, to which users may add more.

To explain clearly the construction and function features of the present invention which selects document travel and can be added to document reading and classifying machines, especially the ones for bar code documents, an example is illustrated by the enclosed figures. As it is a mere example of the invention application, it will not limit the scope of protection of the present patent; it will only serve as an explanation and illustration of the basic concept of the invention.

Figure 1:
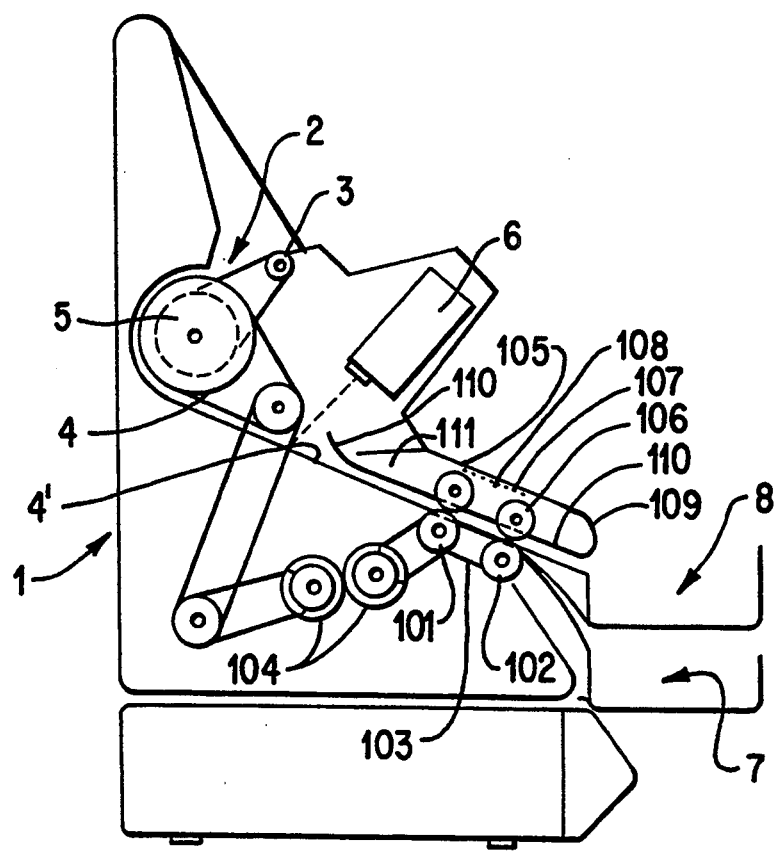
FIG. 1 is a schematic side view of the document reading machine of the present invention.

The different parts are identified with the same references in all the figures.

DETAILED DESCRIPTION

As shown in FIGS. 1–4, the device includes a general cabinet 1 with a hopper 2 for deposit of documents to be read. A mechanism 3 is provided for the selection and drawing out of the documents to be read. As illustrated, the mechanism includes a rotating cam which feeds one document at a time into one of the travel circuits or paths 4. The assembly is driven by a motor 5 along a section of the travel path 4 and a reading element 6 such as a laser scanner which codifies the information read and incorporates it to a data base, or prints it or uses it for a secondary purpose, etc., using a microprocessor. Finally, the already read documents are ejected and stored in one or more hoppers 7 and 8 serving that purpose.

The present invention can be used, for example, to provide conventional or generic equipment with a device for the selection of bifurcated paths or by-passes, of simple design, quick reaction and easy accessibility from the outside.

The present invention includes at least two traction wheels 101 and 102 of the same or different radius which are activated by a transmission belt 103, tooth gears 104 and other transmission components 105 and a motor drive 5.

The wheel mechanism 101 and 102 is conventional and can vary without changing the invention concept.

These wheels 101, 102 are fixed and aligned one with respect to the other, in the same direction as the document advances through the transport mechanism. They are separated from each other and emerge from the surface level describing a secant with respect to the travel surface.

Above each traction wheel 101 and 102, there is an idler wheel 105 and 106, respectively. Both idler wheels are arranged one after the other, and each pair 101-105 and 102-106 are in mutual contact, under the pressure of a spring element. The documents read by the scanner 6 pass between each pair of wheels, so that the gap between them is gauged according to the paper type. The idler wheels are joined by a bridge 107 oscillating on a point 108 between them.

The bridge 107 and the idler wheels 105 and 106 are joined to a part 109 which is articulated to the machine at a point marked 111 to allow the idler wheels to separate from the document travel path to allow passage of the document. The bottom 110 of this part 109 makes the dome for the document transport in the machine, and its articulation at point 111 slightly separates the dome thereby opening the path.

Figure 2:
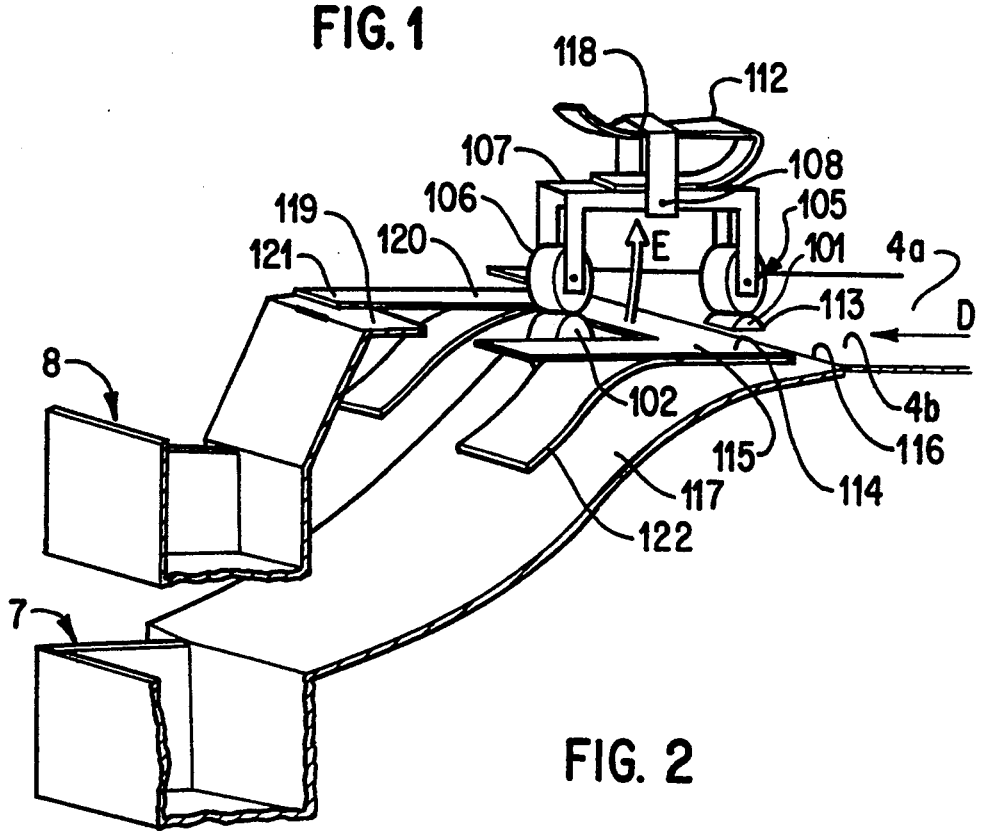
FIG. 2 is a perspective view showing the operation of the present invention.
Figure 3:
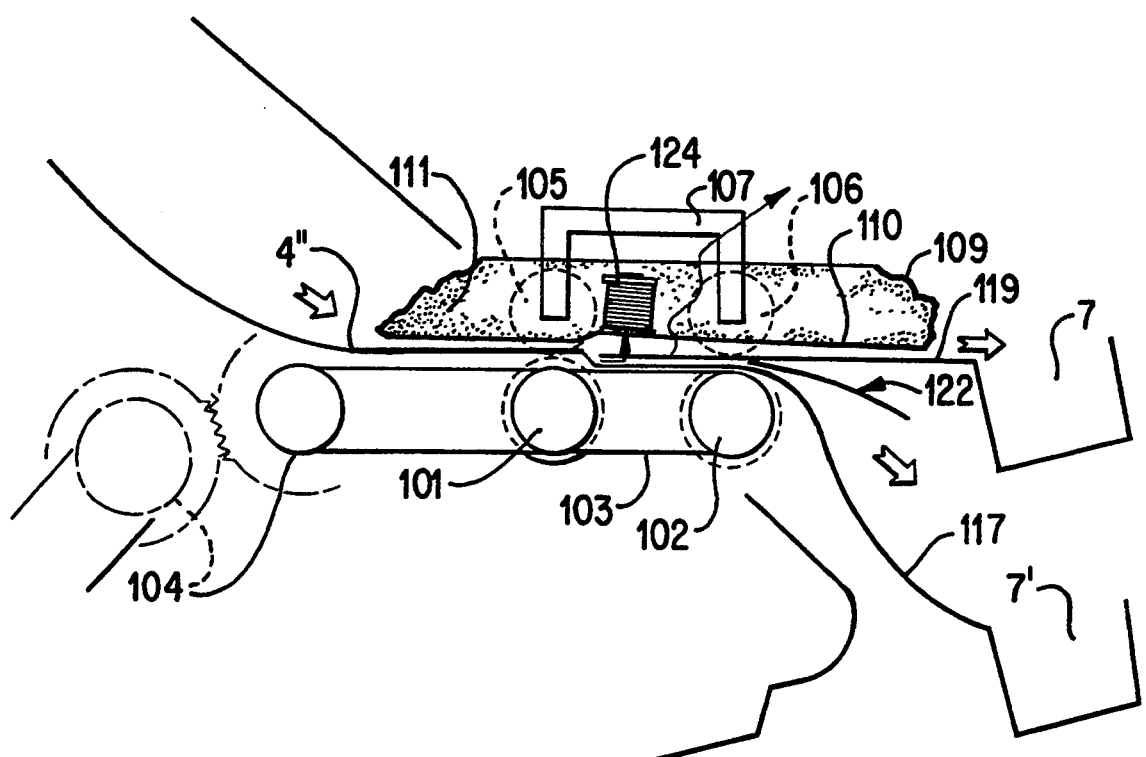
FIG. 3 is a longitudinal view of FIG. 2.

FIG. 2 illustrates that the bridge 107 supports the idler wheels and draws a surface on which a strip 112 lies, forcing the idler wheels against the traction wheels and allowing the document to pass between the facing pair of wheels. This strip 112 (or its equivalent) reacts against a stop 118 related to the previously mentioned pivot axle.

Analyzing the travelling path in the machine and the travelling into the by-passes, we can observe that the travelling circuit or path inside the machine 4 continues up to the area of the reading plane 4a and then follows to the place 4b immediately before the first wheel pair 101-105. These sections are usually flat metallic surfaces, but any other element defining a document supporting path is acceptable. From this point on, it is assumed that the travel sections and their domes are continuous surfaces, although this fact must not be considered as a limitation to this invention.

Part of the traction wheel 101 emerges as a secant through a window 113 cut in the 4b section, and after this window 113, on the section 4b and downstream from the traction wheel 101, lies the free end 114 of the angular movable surface 115. That is to say, the free end 114, transverse to the document advance direction indicated at the arrow D in FIG. 2, leans on the upper surface of the section 4b on an area marked 116.

Downstream from the point 116, the section 4b meets a section descending in slope which determines the first by-pass 117 ending at the first collection hopper 7.

A portion of pivoting surface 115 must allow for the passage of the second traction wheel 102, which is achieved by cutting another window or by opening the surface 115, into a frame 120, downstream, as indicated in FIG. 2. The end 121 of this pivoting surface opposed to the edge 114 serves to determine the pivot axle of the surface marked 115.

Pivoting can be attained by joining the ends 121 of the frame arms 120 into a surface 119 which forms, as a prolongation of the 115 surface, the second by-pass ending at a second collection hopper 8. According to this explanation, the frame arms 120 come into and embed on the surface of the second by-pass 119 so that an element capable of forcing the end 114 upwards may act in a selective way. This element is generically and symbolically represented by an arrow E and may be electromagnet 124 located on the bridge arms 107 as shown in FIG. 4.

Pivoting can also be achieved by joining the ends 121 to a shaft (not shown) which rotates and displaces the surface 115 but keeps the end 121 on a plane with respect to the surface of the second by-pass 119.

The dome of the second by-pass is formed by the mentioned bottom 110, while the dome for the first by-pass passage is supplied by laminar eminences 122 joined and on a same plane with respect to the edge 114.

Figure 4:
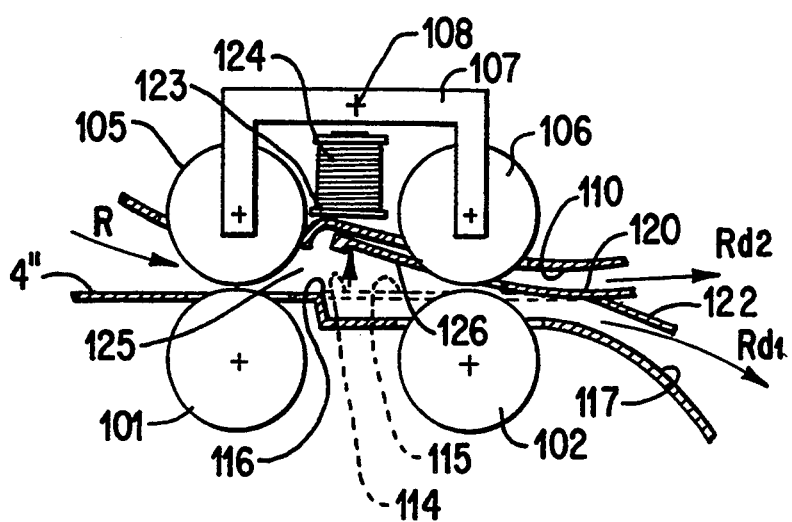
FIG. 4 is a detail view of the portion of the device of the present invention.

The operation of the present invention can be clearly understood by reference to FIG. 4 which shows a simplified amplification of the mechanism.

As FIG. 4 shows, the surface of the section 4b serves as a sliding track for the document which is forced to pass between the pair of wheels 101-105. When the document passes through the gap, the idler wheel taps (according to the weight and type of paper) in order to prevent the paper from passing (or to allow it to pass), and then comes back to its original position by means of a spring strip 112 shown in FIG. 2.

When the document comes out, downstream of the wheels 101, 105, it faces the by-pass entrance 125. Now the document goes straight towards the first by-pass 117 if the pivoting surface 115 is in the position indicated in FIG. 4. This position is achieved by forcing the free end 114 upwards so that the lower face 126 of the surface 115 becomes the beginning of the first by-pass passage dome which is then prolonged by the parts 122.

The end 114 may be lifted by the selective action of the electromagnet 124 or by any other mechanical means. For easy housing of this edge, the dome 110 must have a depletion 123.

Therefore, when the edge 114 is lifted, the document is forced into the first by-pass passage and then falls into the hopper 7.

On the other hand, if the edge 114 rests on section 4b, as shown by the dashed lines in FIG. 4, the upper face 119 serves as the document sliding track. The document then travels between upper face 119 and the bottom 110. In order to avoid clogging of a document against the edge 114, it rests on a shoulder 116 being on a plane 4b with the surface 115, in which case, the document is sent to the hopper 8 of the second bypass.

In both cases, the document is forwarded because of the movement coming from the second pair of wheels 102-106. This pair of wheels must be located downstream of the pivot axle 115 and, for both positions, one of the wheels has to be a secant to one of the two surfaces 115 or 117, as shown in FIG. 4.

The electromagnet 124 is activated by the system logic, according to: reading of one or more parameters performed by the scanner 6; passage or failure to pass of a document through one of the travel paths.

Passage or clogging of a document can be detected by means of sensing elements (not shown) located before and after each by pass.

What is claimed:

1. A document transport selection device for use with document scanners and classifiers, comprising:
   a document supply;
   a first travel path for supporting documents travelling from said document supply;

a reading element for reading and classifying documents travelling along said first travel path;

a first traction means for transporting documents from said travel path to one of a plurality of bypass transport surfaces, the first traction means comprising a first traction roller and a first idler roller urged in mating engagement by a retaining element, whereby the documents pass between the surface of the first traction roller and the first idler roller;

a second traction means for transporting documents from said one of said plurality of bypass transport surfaces to one of a plurality of document receptors corresponding to said one of a plurality of bypass transport surfaces, the second traction means comprising a second traction roller and a second idler roller urged in mating engagement by a retaining element, whereby documents pass between the surface of the second traction roller and the second idler roller; and a moveable surface which pivots about a fixed point in response to a signal from said reading element to direct documents along one of said plurality of transport surfaces, said moveable surface comprising an intermediary portion and a pair of lateral arms forming a substantial U-shape, wherein said second traction means is able to pass between said lateral arms to allow said moveable surface to pivot unopposed by said second traction means.

2. The device according to claim 1, wherein one of said bypass transport surfaces is a first transport surface with a first end located at one end of said first travel path and a second end located at one of said plurality of receptors.

3. The device according to claim 2, wherein free end of said moveable surface rests on said first end of said first bypass transport surface when said moveable surface is in a first position and forms a second bypass transport surface.

4. The device according to claim 3, wherein said free end of said moveable surface is pivoted upwards off said first bypass transport surface when said moveable surface is in a second position allowing said documents to travel along said first transport surface.

5. The device according to claim 4, wherein said reading element comprises a document reader for reading a document connected to a processing means for classifying the document.

6. The device according to claim 5, wherein said moveable surface is pivoted upwards by an electromagnet in response to a signal from said processing means.

7. The device according to claim 1, wherein said reading element is a laser scanner.

8. The device according to claim 1, wherein said first traction wheel emerges as a secant through a cutout portion in the first travel surface.

9. The device according to claim 12, wherein said second traction wheel is able to pass between said lateral arms of said moveable surface between fixed and free ends of said moveable surface.

10. The device according to claim 1, wherein the intermediary portion of said moveable surface rests on said first end of said first bypass transport surface when said moveable surface is in a first position and is pivoted upwards off said first transport surface when said moveable surface is in a second position.

11. The device according to claim 10, wherein said lateral arms of said moveable surface are fixed to and form part of one of said plurality of bypass transport surfaces.

12. A device for reading, classifying and transporting documents from a document supply to one of a plurality of document receptors, comprising:

a reading element for reading and classifying a document;

a first travel path for supporting documents to be read;

a document feeder for drawing documents to be read from the document supply and transporting them along said first travel path past said reading element;

a first traction means at said one end of said first travel path for transporting documents from said first travel path to one of a plurality of bypass transport surfaces, said first traction means comprising a first traction member protruding as a secant through a cutout portion in the first travel surface;

a second traction means for transporting documents from said one of a plurality of bypass transport surfaces to one of a plurality of document receptors corresponding to said one of a plurality of bypass transport surfaces, said second traction means comprising a second traction member and an idler member urged in mating engagement, whereby said documents pass between the surface of said second traction member and said idler member; and a moveable surface with a fixed end and a free end, wherein said moveable surface pivots about its fixed end between a plurality of positions in response to a signal from said reading element to direct documents from said travel path to one of said plurality of bypass surfaces, said moveable surface comprising a cutout portion between said fixed and free ends, wherein said second traction member and idler member are able to pass through said cutout portion to allow said movable surface to pivot unopposed by said second traction means;

wherein one of said bypass transport surfaces is a first transport surface with a first end located at said one end of said first travel path and a second end located at one of said plurality of receptors, said free end of said moveable surface rests On said first end of said first bypass transport surface when said moveable surface is in a first position to form a second bypass transport surface and is pivoted upwards off said first bypass transport surface when said moveable surface is in a second position to allow said documents to travel along said first transport surface.

* * * * *